(12) United States Patent
Remley et al.

(10) Patent No.: US 6,276,284 B1
(45) Date of Patent: Aug. 21, 2001

(54) SIDE-BY-SIDE ROBOT WORKCELL

(75) Inventors: Fred K. Remley, Blue Grass; Jan C. Mangelsen, Charlotte, both of IA (US)

(73) Assignee: Genesis Systems Group, Davenport, IA (US)

( * ) Notice: Subject to any disclaimer, the term of this patent is extended or adjusted under 35 U.S.C. 154(b) by 0 days.

(21) Appl. No.: 09/425,567

(22) Filed: Oct. 22, 1999

(51) Int. Cl.$^7$ ........................................ A47B 11/00
(52) U.S. Cl. .................... 108/20; 108/103; 108/139; 74/106
(58) Field of Search .................... 108/20, 102, 103, 108/137, 139, 140, 142; 74/106; 248/654, 186.2

(56) References Cited

U.S. PATENT DOCUMENTS

| | | |
|---|---|---|
| 4,303,166 | 12/1981 | Campbell et al. . |
| 4,740,135 * | 4/1988 | Shulenberger ............... 108/20 X |
| 4,856,741 * | 8/1989 | Schaefer ..................... 108/20 X |
| 5,096,364 | 3/1992 | Messer et al. . |
| 5,180,276 | 1/1993 | Hendrickson . |
| 5,332,352 | 7/1994 | Poduje et al. . |
| 5,587,637 | 12/1996 | Ohyama . |
| 5,588,789 | 12/1996 | Muka et al. . |
| 5,696,574 * | 12/1997 | Schwaegerle .............. 108/140 X |
| 5,702,228 | 12/1997 | Tamai et al. . |
| 5,872,892 | 2/1999 | Brown et al. . |

* cited by examiner

*Primary Examiner*—Janet M. Wilkens
(74) *Attorney, Agent, or Firm*—Zarley, McKee, Thomte, Voorhees & Sease

(57) ABSTRACT

A side-by-side robot workcell includes two tables each of which is movable from a work position to a load position. Linkages are connected to the tables and cause the tables to have a slow speed at the time the tables approach either the load or the work position, and a faster speed in the middle of the movement between the work and load positions.

16 Claims, 4 Drawing Sheets

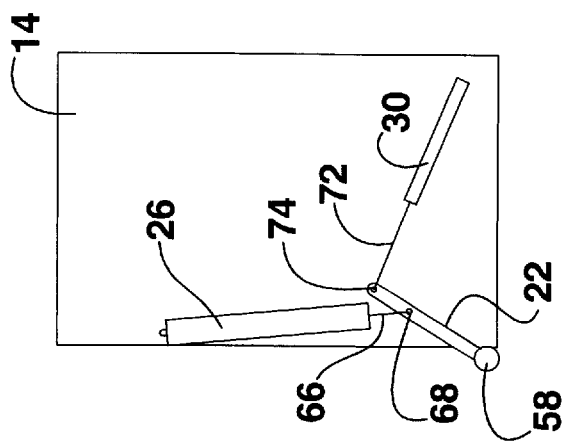
Fig. 3C (Work)
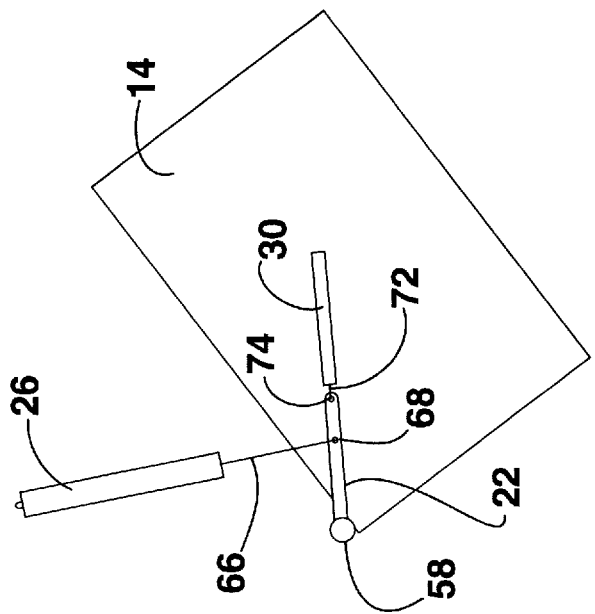
Fig. 3B (Intermediate)
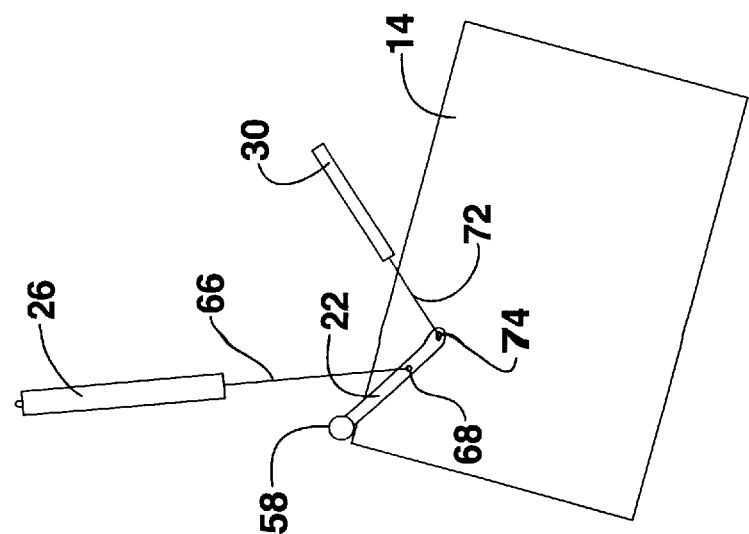
Fig. 3A (Load)

SIDE-BY-SIDE ROBOT WORKCELL

BACKGROUND OF THE INVENTION

This invention relates to a side-by-side robot workcell.

Workcells are often used with robotic systems. The workcells usually include a work piece holder which moves from a load position adjacent the operator to a work position adjacent the robot.

There is a need for a low cost robotic weld station which maintains the safety and functionality of the workcell, but which minimizes the cost.

Therefore, a primary object of the present invention is the provision of an improved side-by-side robot workcell.

A further object of the present invention is the provision of an improved side-by-side robot workcell which is simple in construction and low in cost.

A further object of the present invention is the provision of a side-by-side robot workcell which includes two tables that move quickly to their load and work positions, but which slow down as they approach either the load or the work position.

A further objection of the present invention is the provision of a side-by-side robot workcell which minimizes the need for the operator to move and which maximizes the safety of the operator.

A further object of the present invention is the provision of an improved side-by-side robot workcell which moves the tables to load positions which substantially wrap around the operator so that the operator does not have to walk or move distances to load the work piece on the work piece tables.

A further object of the present invention is the provision of a side-by-side robot workcell which is efficient in operation, economical in manufacture and durable in use.

SUMMARY OF THE INVENTION

The foregoing objects may be achieved by a work piece cell having a frame and a work piece table adapted to hold a work piece. A hinge mechanism connects the work piece table to the frame for movement about a pivot axis from a load position to a work position. A link member is connected to the hinge mechanism and is movable back and forth between a first position and a second position for causing the work piece table to move about the pivot access between the load and the work positions respectively. A power member is connected to the frame and to the link member for causing movement of the link member between its first and second positions. A counterbiasing member is connected to the frame and to the link member and exerts a counterbiasing force on the link in a direction opposite to the force exerted by the power member during at least a portion of the time that the power member moves the link member between the first and second positions.

According to one feature of the invention the link member moves to an intermediate position between its first and second positions and the counterbiasing member exerts a large counterbiasing force on the link member when the link member is in its first or second positions. The counterbiasing member also exerts a lesser biasing force on the link member when the link member is in its intermediate position.

Another feature of the present invention includes two work piece tables constructed in the manner described above each being movable between a load position and a work position. When in the work position the two tables are positioned side-by-side with respect to each other and are positioned adjacent the robot. When in the load position the two tables are positioned closely adjacent the operator so that the operator is not required to move far distances to place a work piece on the work piece table.

BRIEF DESCRIPTION OF THE FIGURES OF THE DRAWINGS

FIGS. 3A, 3B, and 3C are schematic views showing the arrangements of the cylinder, link, and shock absorber during movement of the table between its load and work positions.

DETAILED DESCRIPTION OF THE PREFERRED EMBODIMENT

Figure 4:
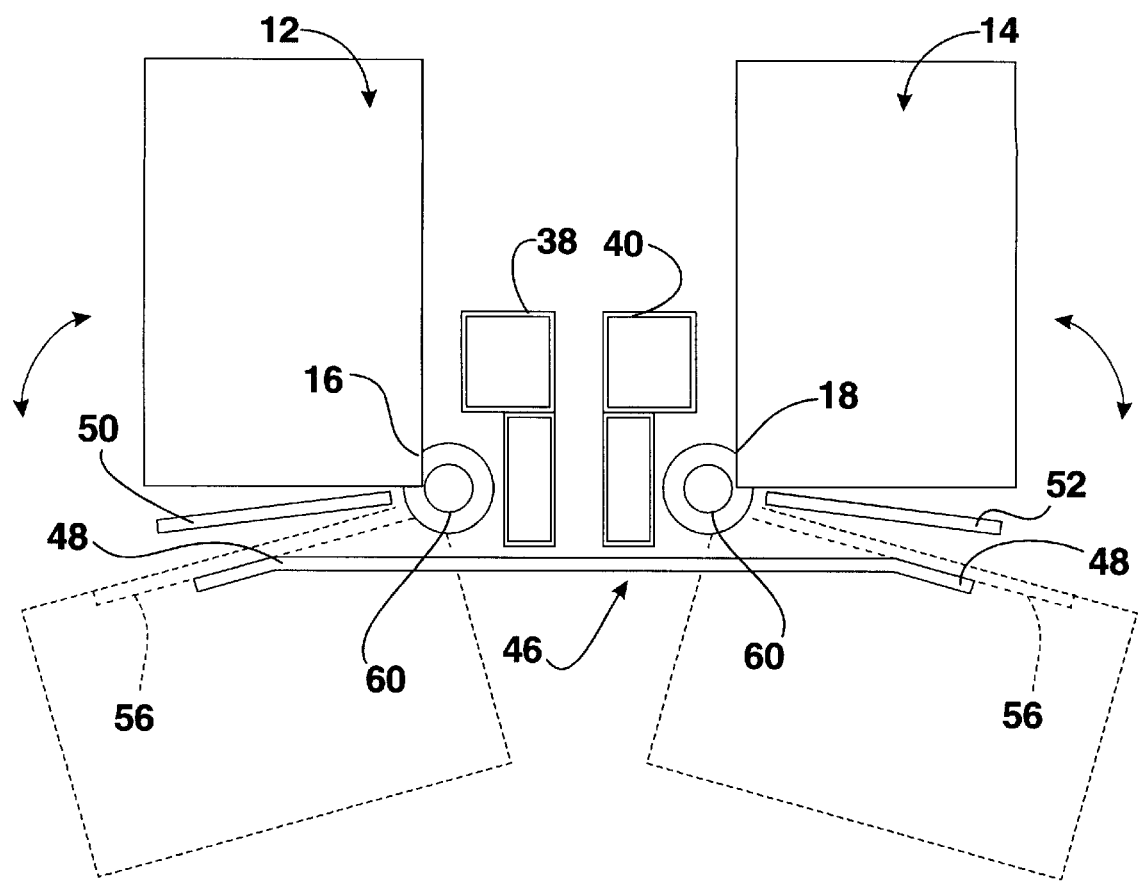
FIG. 4 is a schematic view showing the side-by-side arrangement of the two worktables in both their work position and their loading position.

Referring to the drawings the numeral 10 generally designates the side-by-side workcell of the present invention. Cell 10 is mounted upon a base 8 and includes a first table 12 and a second table 14 (FIG. 4) which are mounted to first and second hinge mechanisms 16, 18 respectively for pivotal movement between a side-by-side work position (shown in solid lines in FIG. 4) and a loading position (shown in shadow lines in FIG. 4), The mechanism for moving the tables between their load and work positions include first and second links 20, 22, first and second cylinders 24, 26, and first and second shock absorbers 28, 30.

The base 8 includes a front frame member 32, a rear frame member 34, and a plurality of cross frame members 36 which extend therebetween. Extending upwardly from the base 8 are first and second vertical frame members 38, 40 which support a stationary shield plate 42 at their upper ends. A control panel 44 is also mounted to the first and second vertical frame members 38, 40.

Extending across the front of vertical frame members 38, 40 is a stop plate 46 which has opposite angled ends 48.

Each of the two first and second work tables 12, 14 include first and second vertical shield plates 50, 52 respectively. The tables 12, 14 are welded to the vertical hinge mechanisms 16, 18 respectively at a weld joint indicated by the numeral 54. In addition a gusset member 56 is welded at its lower end to one of the first or second hinge mechanisms 16, 18 and extends at an angle upwardly to be welded to the under surface of one of tables 12, 14 so as to provide further support thereof.

Figure 1:
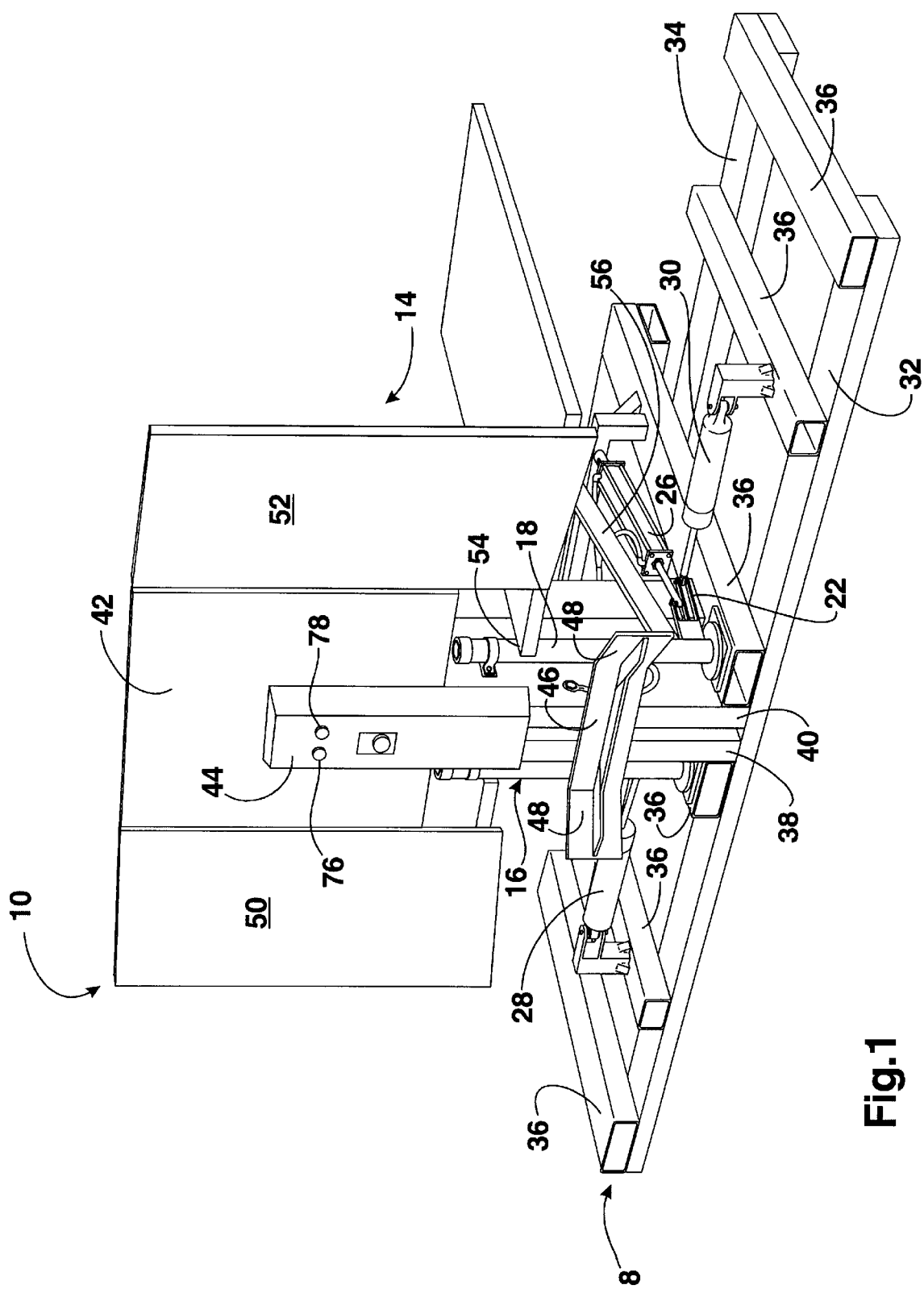
FIG. 1 is a pictorial view of the side-by-side robot workcell of the present invention.
Figure 2:
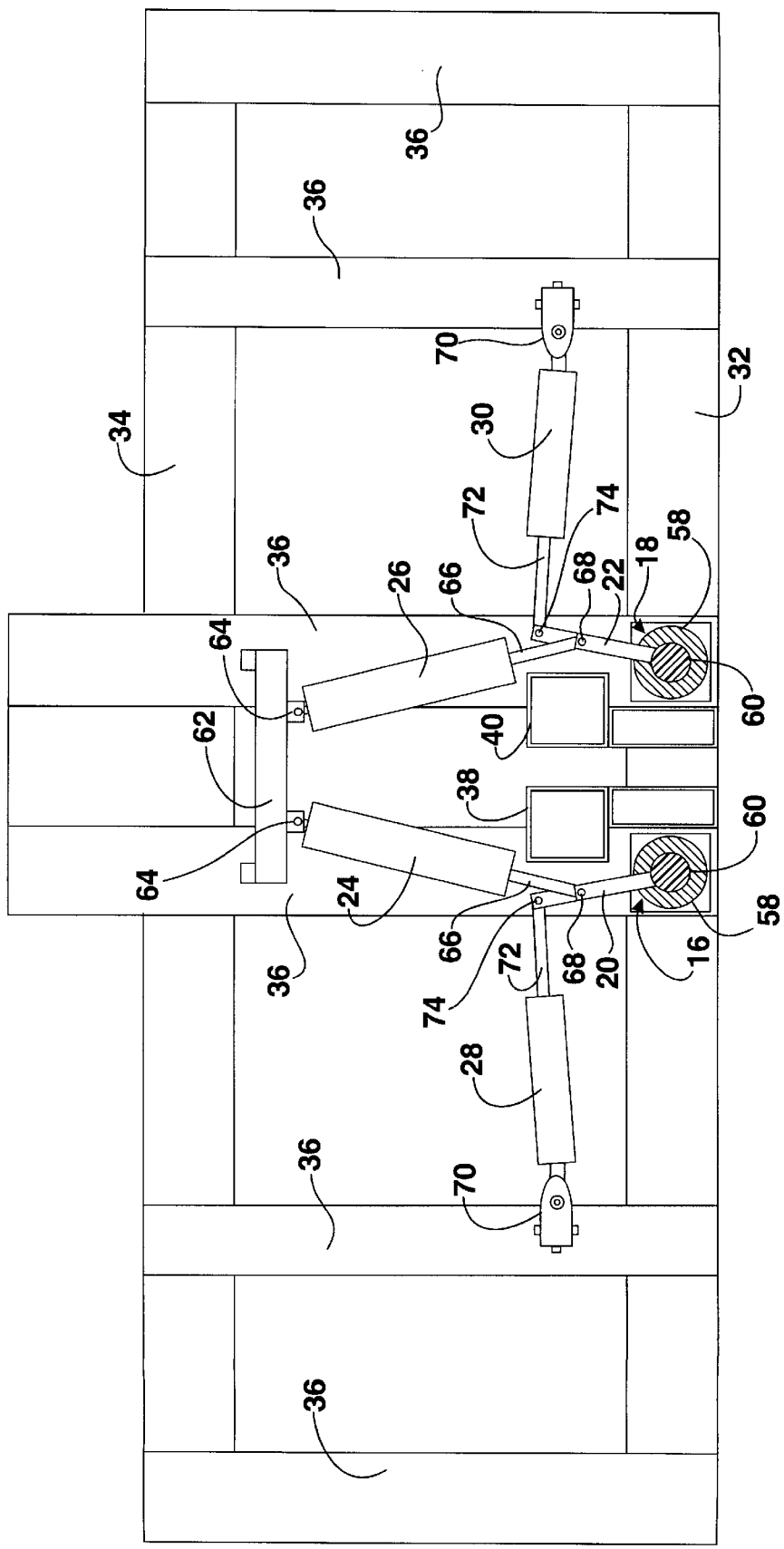
FIG. 2 is a plan view of the linkage, cylinder, and shock absorber construction of the present invention and showing the vertical hinges in section.

Each of the first and second hinge mechanisms 16, 18 include a rotatable sleeve 58 which rotates about a vertical shaft 60 (FIG. 2).

Referring to FIG. 2, each of the first and second cylinders 24, 26 are hinged to a cylinder frame member 62 for pivotal movement about a clevis 64. Each of the cylinders 24, 26 include a cylinder rod 66 which is pivotally connected at a pivot connection 68 to one of the links 20, 22.

The first and second shock absorbers 28, 30 each include a shock absorber clevis 70 pivotally connecting the shock absorbers 28, 30 to frame 8. Extending from each of the shock absorbers 28, 30 is a shock absorber rod 72. The outer end of rod 72 is pivotally mounted to one of the links 20, 22 at a pivot connection 74.

Referring now to the schematic diagrams of FIGS. 3A, 3B and 3C, the work piece table 14 is shown in its load position in FIG. 3A, its intermediate position in FIG. 3B, and its work position in FIG. 3C. The cylinder 26 is in its fully extended position when the table 14 is in its load position shown in FIG. 3A. It is partially extended in the intermediate position shown in FIG. 3B, and it is retracted in the work position shown in FIG. 3C.

The shock absorber 30 has the rod 72 fully extended in the load position of FIG. 3A and in the work position of FIG. 3C. However, in the intermediate position shown in FIG. 3B the shock absorber is fully or at least partially retracted.

The geometry is chosen so that the counterbalancing force of the shock absorber 30 is at its maximum force in the load and work positions of FIGS. 3A and 3C, and it is at a minimum in the over center or intermediate position shown in FIG. 3B. This results in the table moving more slowly at its work and load positions, but moving more quickly as it approaches and leaves the intermediate position. This insures that the table moves quickly as it approaches and leaves the intermediate position, but slows down immediately prior to reaching its load and work positions.

In the preferred embodiment cylinder 26 is a pneumatic cylinder. However, other types of cylinders could be used and other types of prime movers could be used such as electric motors, servo motors, or hydraulic motors.

Shock absorber 30 is preferably an automotive type of shock absorber. The mounting point geometry of the cylinder 26 and the shock absorber 30 is such that the cylinder has the smallest lever arm at the beginning and at the end of the table motion, and the shock absorber has the greatest lever arm at the beginning and end of the table motion. Conversely the air cylinder 26 has the greatest lever arm at mid stroke while the shock absorber 30 is hardly moving when the table is in this range. This makes the table move more slowly at the beginning and end of the motion, and more quickly through the center of the motion. This is referred to as a ramp up/ramp down velocity during the table movement, and is good for both safety and quick movement.

To permit a faster ramp up speed without affecting the ramp down speed, a split valve shock absorber may be used as shock absorber 30. This type of shock absorber has more resistance while being extended than it does when being compressed.

The operator can initiate movement of the tables 12, 14 from their load positions to their work positions respectively by pressing the buttons 76 or 78 respectively on control panel 44. However, for safety, the robot is used for initiating movement from the work position to the load position. This is done by programming the robot to press a button (not shown) when the robot has completed its work on the work piece. This procedure insures that the tables do not leave their work positions before the robot has completed its work.

In the work position the ends 48 of stop bar 46 engage the gussets 56 of work tables 12, 14 to prevent the tables from moving past their work positions.

The side-by-side work cell of the present invention minimizes the amount of walking for the operator, while not requiring the operator to be in a position where he or she may be in harms way of the robot or any welding arc flash. To accomplish this the two tables 12, 14 partially wrap around the operator's position. A panels 50, 52 and panel 42 also provide flash protection during welding operations and establish a barrier between the robot and the operator.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A work piece cell comprising:
   a frame;
   a work piece table adapted to hold a work piece;
   a hinge mechanism connecting said work piece table to said frame for movement about a pivot axis from a load position to a work position;
   a link member connected to said hinge mechanism and being movable back and forth between a first position and a second position for causing said work piece table to move about said pivot axis between said load and said work positions respectively;
   a power member connected to said frame and to said link member for causing movement of said link member between said first and second positions;
   a counter biasing member connected to said frame and to said link member and exerting a counter biasing force on said link member in a direction opposite to a force exerted by said power member during at least a portion of the time that said power member moves said link member between said first and second positions.

2. The work piece cell according to claim 1 wherein said link member moves to an intermediate position between said first and second positions, said counter biasing member exerting a greatest counter biasing force on said link member when said link member is in said first or said second positions, and exerting a least counter biasing force on said link member when said link member is in said intermediate position.

3. The work piece cell according to claim 2 wherein said intermediate position of said link member is half way between said first and second positions.

4. The work piece cell according to claim 1 wherein said power member comprises a cylinder having a longitudinally extensible cylinder rod.

5. The work piece cell according to claim 1 wherein said counter biasing member comprises a shock absorber.

6. The work piece cell according to claim 5 wherein said shock absorber includes a longitudinal shock absorber axis and said link member includes a longitudinal link axis, said link member having an intermediate position between said first and second positions wherein said shock absorber axis and said link axis lie in a single line.

7. The work piece cell according to claim 1 wherein said link member and said work piece table are fixed to said hinge mechanism.

8. The work piece cell according to claim 7 wherein said hinge mechanism comprises an elongated post having a longitudinal post axis, said post being pivotally mounted to said frame for pivotal movement about said post axis.

9. A side by side work piece cell comprising:
   a frame;
   a first work piece table and a second work piece table;
   a first hinge mechanism mounting said first work piece table for pivotal movement about a first pivotal axis between a first work position and a first load position;
   a second hinge mechanism mounting said second work piece table for pivotal movement about a second pivotal axis between a second work position and a second load position;

said first and second work piece tables being in side by side relation when in said first and second work positions, respectively;

a first link member connected to said first hinge mechanism;

a first power member connected to said frame and to said first link member and being capable of exerting a first power force on said first link member to cause said first work piece table to move about said first pivot axis between said first load position and said first work position;

a first counter biasing member connected to said frame and to said first link member and exerting a first counter biasing force on said first link member in a direction opposite to said first power force exerted by said first power member during at least a portion of the time that said first power member moves said first work piece table between said first load position and said first work position;

a second link member connected to said second hinge mechanism;

a second power member connected to said frame and to said second link member and being capable of exerting a second power force said second link member to cause said second work piece table to move about said second pivot axis between said second load position and said second work position;

a second counter biasing member connected to said frame and to said second link member and exerting a second counter biasing force on said second link member in a direction opposite to said second power force exerted by said second power member during at least a portion of the time that said second power member moves said second work piece table between said second load position and said second work position.

10. The work piece cell according to claim 9 wherein said first and second power members each comprise a cylinder having a longitudinally extensible cylinder rod.

11. The work piece cell according to claim 9 wherein each of said first and second counter biasing members each comprise a shock absorber.

12. The work piece cell according to claim 11 wherein each of said shock absorbers of said first and second counter biasing members includes a longitudinal shock absorber axis and each of said first and second link members includes a longitudinal link axis, said shock absorber axis of said first counter biasing member lying in a single line with said link member axis of said first link when said first work piece table is in said first intermediate position, said shock absorber axis of said second counter biasing member lying in a single line with said link axis of said second link member when said second work piece table is in said second intermediate position.

13. The work piece cell according to claim 9 wherein said first and second link members and said first and second work piece tables are fixed to said first and second hinge mechanisms respectively.

14. The work piece cell according to claim 13 wherein each of said first and second hinge mechanisms comprises an elongated post having a longitudinal post axis, said post being pivotally mounted to said frame for pivotal movement about said post axis.

15. The work piece cell according to claim 9 and further comprising said first work piece table being movable to a first intermediate position between said first work position and said first load position, said second work piece table being movable to a second intermediate position between said second work position and said second load position, said first and second counter biasing members exerting said first and second counter biasing forces with a minimum magnitude when said first and second work pieces are in said first and second intermediate positions, respectively and with a greater magnitude exceeding said minimum magnitude when said first and second work piece tables are in said first and second work positions respectively and in said first and second load positions respectively.

16. The work piece cell according to claim 15 wherein said first intermediate position of said first work piece table is half way between said first work position and said first load position, and said second intermediate position of said second work piece table is half way between said second work position and said second load position.

* * * * *